Figure 1:
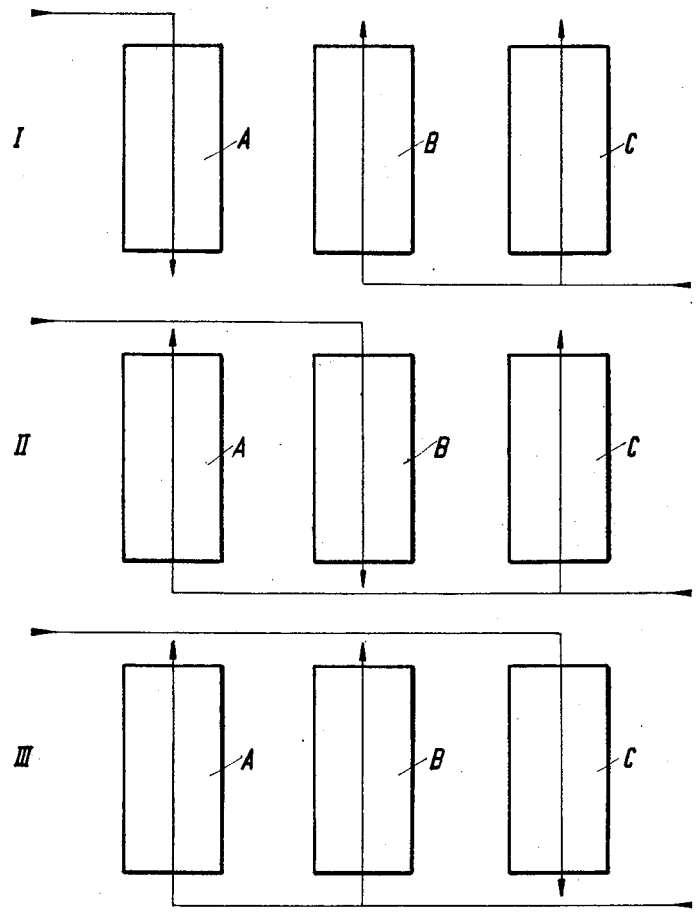

May 14, 1963   W. LEHMER   3,089,311
REGENERATIVE HEAT-TRANSFER PROCESS
Filed Dec. 21, 1959   2 Sheets-Sheet 1

United States Patent Office 3,089,311
Patented May 14, 1963

3,089,311
REGENERATIVE HEAT-TRANSFER PROCESS
Wilhelm Lehmer, Munich, Germany, assignor to Gesellschaft fur Linde's Eismaschinen Aktiengesellschaft, Hollriegelskreuth, near Munich, Germany, a company of Germany
Filed Dec. 21, 1959, Ser. No. 860,781
3 Claims. (Cl. 62—12)

The present invention concerns a regenerator arrangement such as is frequently required in refrigeration, and as used, for example, for cooling and for a preliminary purification of the crude gases in gas- and air-separating plants.

In crude gas-separating plants the gas is generally conducted in the so-called "hot period" through a regenerator—which previously has been cooled to a low temperature—so that it is cooled and is, at the same time, freed from constituents, such as steam and carbon dioxide, condensing in the temperature range of the regenerator. In the second, so-called "cold period," the regenerator is traversed in the opposite direction by a cold gas-current—particularly, a gaseous separation product—which cools the regenerator again and liberates the deposits disposed on the filler mass, for example, carbon dioxide, water and the like, particularly by sublimation. In general, the crude gas—hot gas current has a higher pressure than the purifying and cooling current—cold gas current. In air separating plants air, which has been compressed to about 5 to 6 atmospheres absolute, for example, is conducted in the hot period through the regenerator, while the separation product passing through in the cold period, particularly nitrogen and/or oxygen, have a pressure of little more than the atmospheric pressure, for example, 1.2 or 1.1 atmospheres.

It is also known to employ an arrangement of three regenerators in a three-phase operation. In this case two separate periods are included in the hot period, in such a way that deposits retained in the regenerator are at least partly removed by a scavenging gas, which, if necessary, may have a higher temperature while in the ensuing period the cooling of the filler mass is effected by means of a corresponding cold gas current. This measure can advantageously be used, for example, when the available cold gas current, particularly a current of cold gaseous separation products, is of insufficient volume to remove the deposits completely in one period from the regenerator.

It has also been suggested to provide in certain circumstances at least one additional period, and to include in the apparatus assembly at least one additional regenerator to remove the last traces of the deposits from the regenerator, using a vacuum, if necessary, with simultaneous heating.

Furthermore, it has been proposed to connect several regenerators in parallel in such a way that the crude gas—for example, air—in the hot period flows in parallel through two regenerators with a different cross-section, while the sublimation and purification, respectively, during the cold period is effected separately by gaseous separation products (for example, nitrogen and oxygen), obtained in an adjoining separating apparatus, by for example, providing that the regenerator with the larger cross-section is traversed by nitrogen and the one with the smaller cross-section by oxygen.

In the above-mentioned known arrangements it was necessary to adapt the individual regenerator—apart from its type of use—with regard to its design, particularly its length, its cross-section, its wall thickness, its filling mass, etc., in form and material to the respective type of gas and particularly to the respective gas pressure. The ratio of the diameter of the circular cross-section of each regenerator to its effective length, particularly height of charge, was generally at least 2:1, normally 2.5:1 for the most common crude gases and separation products as well as at the ordinary pressures, particularly of the crude gases, and the pressure ratios respectively between hot current and cold current, which are usually of the order of about 2:1 to 5:1.

The problem underlying the invention consists of selecting optimum conditions for the application and design of the various regenerators, and their type of operation respectively, when gases with higher pressures, particularly higher pressure ratios between hot and cold periods are to be used, the optimum conditions being possibly such that they are still applicable under normal pressure and pressure ratio conditions and even more advantageous and less expensive than the known heat regenerator possibilities.

The invention concerns in particular heat transfer by means of storage by at least three regenerator cross-sections, in which freezable constituents of the compressed crude gas are retained and subsequently separated by means of another gas, particularly at least one gaseous separation product of the crude gas, under cooling of the filler mass, at least two regenerator cross-sections being connected in parallel in each reversal period.

This problem is solved, according to the present invention, in this way, that the cold current is distributed in each period over at least two regenerator cross-sections connected in parallel, while in each period the hot current, which has a considerably higher pressure—preferably, at least a four-fold pressure—flows through a smaller number of regenerator cross-sections, particularly a single regenerator cross-section.

The functional equivalent of at least one additional regenerator cross-section can be realized either by an additional complete regenerator or by a tube system embedded in the filler mass of the regenerator in such a way that the regenerator is traversed partly inside and partly outside of this tube system. The additional regenerator cross-section, particularly a complete regenerator, is preferably adapted with regard to its cross-section, flow resistance, heat transfer coefficients, and if possible, also with regard to all other characteristic data, to the other regenerator cross-section and regenerators respectively.

The technical progress achieved by the invention consists in the following:

The tests and considerations underlying the present invention have shown that with a different dimensioning, adapted to the higher pressures, regarding the wall thickness and the geometric measurements, particularly regarding the ratio cross-section diameter to the length of the regenerator, considerable losses and additional expenditures would occur, first of all because the dead space between the charge and the valves would be relatively increased, and because the wall thickness would have to be greater with higher pressures, so that—compared to the diameter and the height of charge—the longitudinal heat conduction through the wall has a greater effect than with normal dimensions, which in turn has an unfavorable effect on the necessary geometric design. Altogether one encounters in this way generally greater switching losses. These are at any rate power losses which are accompanied at the same time by gas losses.

These disadvantages are eliminated to a great extent by the application of an additional regenerator cross-section. Thereby, the increase in the switching losses is completely avoided; also, additional expenditure is kept low because it is possible to design the individual regenerators with approximately the same geometric dimensions and other necessary measurements, for reasons of heat conduction, as is customary in the known most commonly used regenerator arrangement for low pressure ratios, in which case, however, the wall thickness has to be dimensioned correspondingly. Besides, a more uneconomical additional expenditure, particularly manufacturing costs, would be caused by the necessary greater dimensions.

According to another feature of the invention the conditions at particularly high pressure ratios can be improved by taking into account additional conditions which are of less significance at normal pressure ratios.

It is particularly desirable to make the charge of the filler mass as dense as possible, for which purpose steel grains have proved particularly suitable.

It is also desirable that the ratio of height of charge to the cross-sectional diameter should not be less than 2:1, preferably not less than 2.5:1.

With pressure ratios of the order of 4:1 or more, particularly more than 6:1, one additional regenerator or regenerator cross-section respectively is generally sufficient. If one starts with a pressure ratio of about 15–20:1, the pressure drop from the start to the end of the regeneration, which would be with only one regenerator about 1:20 to 1:15 for the cold period, would be reduced to about 1:5 by using two regenerators connected in parallel, which pressure drop corresponds approximately to the most common conditions for the operation of regenerators. One can start from the consideration that the pressure drop is about proportional to the second to third root of the pressure ratio. With even higher pressure ratios, one or even several additional regenerators or regenerator cross-sections respectively would have to be used.

Another feature of the invention consists in that the amount of hot gas is also distributed over two or more regenerators or regenerator cross-sections respectively, which amounts to a doubling, tripling or even greater multiplication of the total number of necesarry regenerators and regenerator cross-sections respectively. It is of particular advantage to operate the two or more sets of regenerators not simply in parallel but rather to stagger the switching times of the various regenerator sets in point of time, whereby to subject after-connected turbines or other vessels to weaker impulses.

Figure 2:
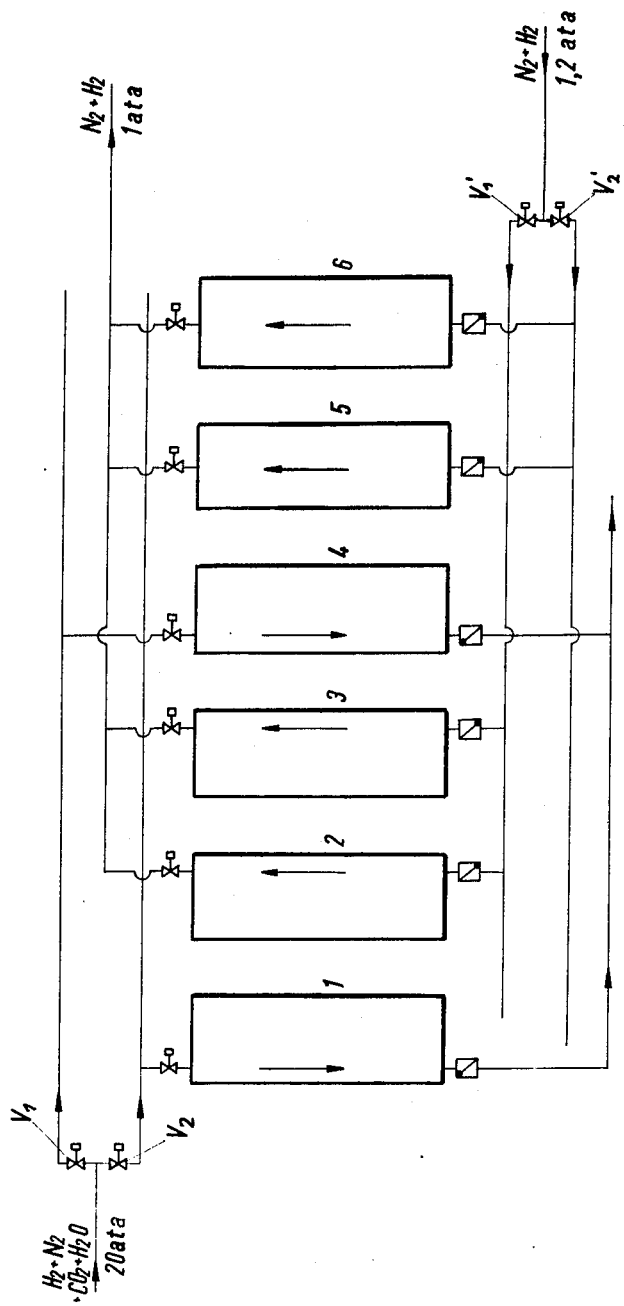

The invention will now be described more fully on the basis of the attached drawing, in which FIGURES 1 and 2 are circuit diagrams illustrating embodiments of the arrangement according to the invention by way of example.

In FIG. 1, A, B and C denote three regenerators which are pre-connected to a gas separating plant for the production of deuterium, which latter is separated from a mixture of hydrogen, nitrogen and deuterium. The mixture of hydrogen and nitrogen as obtained contains carbon dioxide and steam, and is at a pressure of 20 atmospheres. A gas mixture of nitrogen and hydrogen of about the same composition issues from the gas separating plant with a pressure of about 1.2 atmospheres.

The three regenerators (FIGS. 1 and 2) are represented in their three operating periods, I, II and III, the arrows indicating in each case the direction of the gas flow. The current from the top to the bottom through the regenerators represents the gas mixture of hydrogen and nitrogen to be cooled, while the current from the bottom to the top through the regenerator represents the gas mixture issuing from the gas separating plant and used partly for scavenging and partly for cooling. It will be apparent that in each period one regenerator is traversed by the crude gas mixture from the top to the bottom, while two regenerators, connected in parallel, are traversed by the issuing gases for cooling and purification.

In FIG. 2, two such sets of three regenerators each are combined into a sextet, so that the crude gas current is distributed over each of two regenerators and the issuing gas current over each of four regenerators. The periods of the two triple arrangements of regenerators are phase-displaced with regard to each other by 180°.

The drawing shows only those lines and valves which are traversed in the represented period. The high pressure hot gas current traverses the two regenerators 1 and 4 with the two valves V1 and V2 being phase-displaced with regard to each other by 180°. The 1.2 atmospheres cold gas current of nitrogen and hydrogen is in each case distributed between two parallel currents over two regenerators, namely 2 and 3 on the one hand, and 5 and 6, on the other hand, the two valves V1' and V2' being phase-displaced with regard to each other by 180°, like the valves V1 and V2, i.e., the valves with the same index work simultaneously.

The after-connected gas separating plant can be designed in known manner or as suggested in German Patents Numbers: 1,041,989; 1,078,596; and 1,063,189. The schematically represented regenerators 1—6 have approximately the same dimensions and heat-transfer characteristics as the regenerators used in air separating plants handling hot air compressed to about 5 to 6 atmospheres and cooled by the regenerators.

The patent applications cited above also form in their entire content a constituent of the present application, the possible combinations between the subjects of the above-mentioned applications also forming part of the application.

It has to be noted that it is within the framework of the application to use, in lieu of regenerators, at least partly different heat-exchangers to be connected alternately, for example, reversing exchangers. Besides, combinations with suggested regenerator arrangements have also to be kept in mind where additional regenerators are provided, for example, as heat exchangers for turbine gas heating (see for example German Patent No. 1,065,-867: "Process and apparatus for the production of heat exchange processes in a gas decomposing plant working with pre-connected regenerators," additional to German Patent No. 1,046,640, which Patent 1,065,857 forms in its entire content a part of the present application).

I claim:

1. A process for transferring heat from a warm compressed crude gas to at least one cold separation product gas, at a pressure ratio of at least 6:1, by means of an arrangement of a plurality of cyclically reversing regenerators which are charged with filler mass, characterized in that in each cyclically reversing period said warm compressed crude gas is passed through one regenerator of a set of at least three regenerators provided for each cold separation product to be warmed, thereby cooling the crude gas and freeing it from freezable constituents; and in the same period passing each cold separation product gas in the opposite direction through the remaining at least two other regenerators of its set connected in parallel, thereby (a) vaporizing impurities which in a preceding cyclically reversing period had been frozen out from the crude gas and deposited in at least one of said regenerators of each set of at least three regenerators and (b) cooling the filler mass.

2. A process for transferring heat from a warm compressed crude gas to at least one cold separation product gas, at a pressure ratio of at least 6:1, by means of an arrangement of cyclically reversing regenerators which are charged with filler mass, characterized in that in each cyclically reversing period said warm compressed crude gas is passed through one of each of at least two sets of at least three regenerators provided for at least one cold separation product to be warmed thereby cooling the crude gas and freeing it from freezable constituents, and in the same period passing at least one cold separation product gas in the opposite direction through the remaining at least two other regenerators of the provided sets thereby (a) vaporizing impurities which in a preceding period had been frozen out from the crude gas and (b) cooling the filler mass, whereafter said at least three regenerators of one set are cyclically switched at a time different from the cyclically switching times of the regenerators of the other set or sets.

3. A process according to claim 2, in which two sets of cyclically reversing regenerators are used and the regenerators of the first set are cyclically switched at that time at which about half of the cyclically reversing period of the regenerators of the second set has expired.

References Cited in the file of this patent

UNITED STATES PATENTS

| | | |
|---|---|---|
| 1,599,681 | Seligmann | Sept. 14, 1926 |
| 1,604,240 | Schlitt | Oct. 26, 1926 |
| 2,071,763 | Pollitzer | Feb. 23, 1937 |
| 2,595,284 | Mullins | May 6, 1952 |
| 2,655,796 | Rice | Oct. 20, 1953 |
| 2,671,324 | Trumpler | Mar. 9, 1954 |
| 2,673,456 | Scharmann | Mar. 30, 1954 |
| 2,715,820 | Becker | Aug. 23, 1955 |
| 2,785,548 | Becker | Mar. 19, 1957 |
| 2,836,040 | Schilling | May 27, 1958 |
| 2,915,880 | Schuftan | Dec. 8, 1959 |
| 2,960,836 | Harringhuizen | Nov. 22, 1960 |
| 2,962,867 | Seidel | Dec. 6, 1960 |
| 2,996,890 | Baldner | Aug. 22, 1961 |

FOREIGN PATENTS

| | | |
|---|---|---|
| 625,815 | Canada | Aug. 15, 1961 |
| 1,046,640 | Germany | Dec. 18, 1958 |